United States Patent
Chiu et al.

(10) Patent No.: US 10,452,600 B2
(45) Date of Patent: Oct. 22, 2019

(54) ASSEMBLABLE WIRELESS INTERNET CONNECTED APPARATUS AND INTEGRATED FUNCTION SYSTEM

(71) Applicants: ASKEY COMPUTER CORP., New Taipei (TW); ASKEY TECHNOLOGY (JIANGSU) LTD., Jiangsu Province (CN)

(72) Inventors: Tai-Kuang Chiu, Taoyuan (TW); Chun-Yu Hsu, New Taipei (TW)

(73) Assignees: ASKEY COMPUTER CORP., New Taipei (TW); ASKEY TECHNOLOGY (JIANGSU) LTD., Jiangsu Province (CN)

( * ) Notice: Subject to any disclaimer, the term of this patent is extended or adjusted under 35 U.S.C. 154(b) by 0 days.

(21) Appl. No.: 15/990,810

(22) Filed: May 28, 2018

(65) Prior Publication Data
US 2019/0205281 A1   Jul. 4, 2019

(30) Foreign Application Priority Data
Dec. 28, 2017 (TW) .............................. 106146343 A

(51) Int. Cl.
| G06F 13/36 | (2006.01) |
| G06F 19/00 | (2018.01) |
| G06F 13/42 | (2006.01) |
| H04B 1/3816 | (2015.01) |
| H04W 88/06 | (2009.01) |

(52) U.S. Cl.
CPC ....... *G06F 13/4282* (2013.01); *H04B 1/3816* (2013.01); *G06F 2213/0042* (2013.01); *H04W 88/06* (2013.01)

(58) Field of Classification Search
CPC .................................. G06F 13/36; G06F 19/00
See application file for complete search history.

(56) References Cited

U.S. PATENT DOCUMENTS

| 2009/0327767 A1* | 12/2009 | Ginzburg | .......... H04W 52/0274 |
| | | | 713/300 |
| 2010/0299517 A1* | 11/2010 | Jukic | .................. H04L 12/2809 |
| | | | 713/150 |
| 2011/0185048 A1* | 7/2011 | Yew | .................. H04M 1/72527 |
| | | | 709/221 |

* cited by examiner

*Primary Examiner* — Hyun Nam
(74) *Attorney, Agent, or Firm* — JCIPRNET

(57) ABSTRACT

An assemblable wireless Internet connected apparatus and an integrated function system are provided. The integrated function system includes a function-extended apparatus and the assemblable wireless Internet connected apparatus. The function-extended apparatus includes a first communication interface complied with USB and UART standards. The assemblable wireless Internet connected apparatus includes a wide area network wireless communication module, a second communication interface and a computation-and-controlling unit. The wide area network wireless communication module connects the Internet. The second communication interface is used for engaging with the first communication interface and is complied with the aforementioned two standards. The computation-and-controlling unit communicates with the function-extended apparatus through the second communication interface, and transmits data from the function-extended apparatus to Internet through the wide area network wireless communication module. Accordingly, a separable product with heterogeneous network integration and a novel development way are provided.

16 Claims, 6 Drawing Sheets

UART TX
UART RX
GRND
VBUS
USB D+
USB D−

ASSEMBLABLE WIRELESS INTERNET CONNECTED APPARATUS AND INTEGRATED FUNCTION SYSTEM

CROSS-REFERENCE TO RELATED APPLICATION

This application claims the priority benefit of Taiwan application serial no. 106146343, filed on Dec. 28, 2017. The entirety of the above-mentioned patent application is hereby incorporated by reference herein and made a part of this specification.

BACKGROUND OF THE DISCLOSURE

Field of the Disclosure

The disclosure relates to an apparatus integration technique, and particularly relates to an assemblable wireless Internet connected apparatus and an integrated function system.

Description of Related Art

Most of portable electronic products in the market generally have single body product design. In order to achieve a light and slim appearance, a part of the portable electronic products even does not have extensibility, which limits innovation and development of third-party developers. Not only these electronic products do not have extended function, if these electronic products do not have hardware specifications with high performance, they may soon be eliminated from the market.

On the other hand, many micro devices (for example, various detectors, smart switches, etc.) have been provided in the market. However, a hardware specification of these micro devices is generally simple, and it is more necessary to obtain data thereof through an additional transmission line or by loading a memory card, etc., which is inconvenient to the user.

SUMMARY OF THE DISCLOSURE

The disclosure is directed to an assemblable wireless Internet connected apparatus and an integrated function system, which provide an open standard specification communication interface for third-party developers, and other apparatus is adapted to transmit data of itself to the Internet through combining operation.

The disclosure provides an assemblable wireless Internet connected apparatus, which is adapted to connect a function-extended apparatus and includes a wide area network wireless communication module, a communication interface and a computation-and-controlling processing unit. The Wide Area Network (WAN) wireless communication module is used to connect Internet. The communication interface is used to connect the function-extended apparatus and comply with two communication interface standards, where the two communication interface standards include a Universal Serial Bus (USB) standard and a Universal Asynchronous Receiver/Transmitter (UART) standard. The computation-and-controlling unit is used to couple to the wide area network wireless communication module and the communication interface, and communicates through the communication interface, and transmits data obtained from the communication interface to Internet through the wide area network wireless communication module.

In an embodiment of the disclosure, the communication interface includes a VBUS pin, a D+ pin, a D− pin and a ground pin complied with the USB standard.

In an embodiment of the disclosure, the communication interface includes a transmitting (TX) pin, a receiving (RX) pin and a ground pin complied with the UART standard.

In an embodiment of the disclosure, the assemblable wireless Internet connected apparatus further includes an enable-switch. The enable-switch is used to couple to the computation-and-controlling processing unit, and when the enable-switch is triggered, the computation-and-controlling processing unit starts transmission of the wide area network wireless communication module.

The disclosure provides an integrated function system including a function-extended apparatus and an assemblable wireless Internet connected apparatus. The function-extended apparatus includes a first communication interface, and the first communication interface is complied with two communication interface standards, where the two communication interface standards include a Universal Serial Bus (USB) standard and a Universal Asynchronous Receiver/Transmitter (UART) standard. The assemblable wireless Internet connected apparatus includes a wide area network wireless communication module, a second communication interface and a computation-and-controlling processing unit. The wide area network wireless communication module is used to connecting Internet. The second communication interface is used to engaging with the first communication interface of the function-extended apparatus and is complied with the above two communication interface standards. The computation-and-controlling processing unit is used to couple to the wide area network wireless communication module and the second communication interface, and communicates with the function-extended apparatus through the second communication interface, and transmits data coming from the function-extended apparatus to the Internet through the wide area network wireless communication module.

In an embodiment of the disclosure, the first and second communication interfaces include a VBUS pin, a D+ pin, a D− pin and a ground pin complied with the USB standard.

In an embodiment of the disclosure, the first and second communication interfaces include a TX pin, a RX pin and a ground pin complied with the UART standard.

In an embodiment of the disclosure, the ground pin of the USB standard and the ground pin of the UART standard are in common.

In an embodiment of the disclosure, the assemblable wireless Internet connected apparatus further includes an enable-switch. The enable-switch is used to couple to the computation-and-controlling processing unit, and when the enable-switch is triggered, the computation-and-controlling processing unit starts transmission of the wide area network wireless communication module.

In an embodiment of the disclosure, the assemblable wireless Internet connected apparatus further includes a global coordinate positioning module. The global coordinate positioning module is used to couple to the computation-and-controlling processing unit, and is used for obtaining positioning information. The computation-and-controlling processing unit sends the positioning information through the wide area network wireless communication module.

In an embodiment of the disclosure, the function-extended apparatus further includes a Local Area Network (LAN) communication module. The local area network communication module is used to couple to the first communication interface, and is used for connecting a local area network. The computation-and-controlling processing unit of the assemblable wireless Internet connected apparatus receives data coming from the local area network through the second communication interface and the first communication interface.

In an embodiment of the disclosure, the function-extended apparatus further includes a communication select-switch. The communication select-switch is used to couple to the first communication interface, and is used for enabling communication of the first communication interface.

According to the above description, the embodiment of the disclosure provides an open standard communication interface, such that the third-party developers may develop the function-extended apparatus. After the function-extended apparatus and the communication interface of the assemblable wireless Internet connected apparatus are docked, the two apparatuses may communicate with each other, and data of the function-extended apparatus may be transmitted to Internet through the assemblable wireless Internet connected apparatus. In this way, a new type of application is created, and breadth and depth of commodity combination application are enhanced, so as to expand an application field of commodity by using community development resources and expand the development of product ecological chain.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
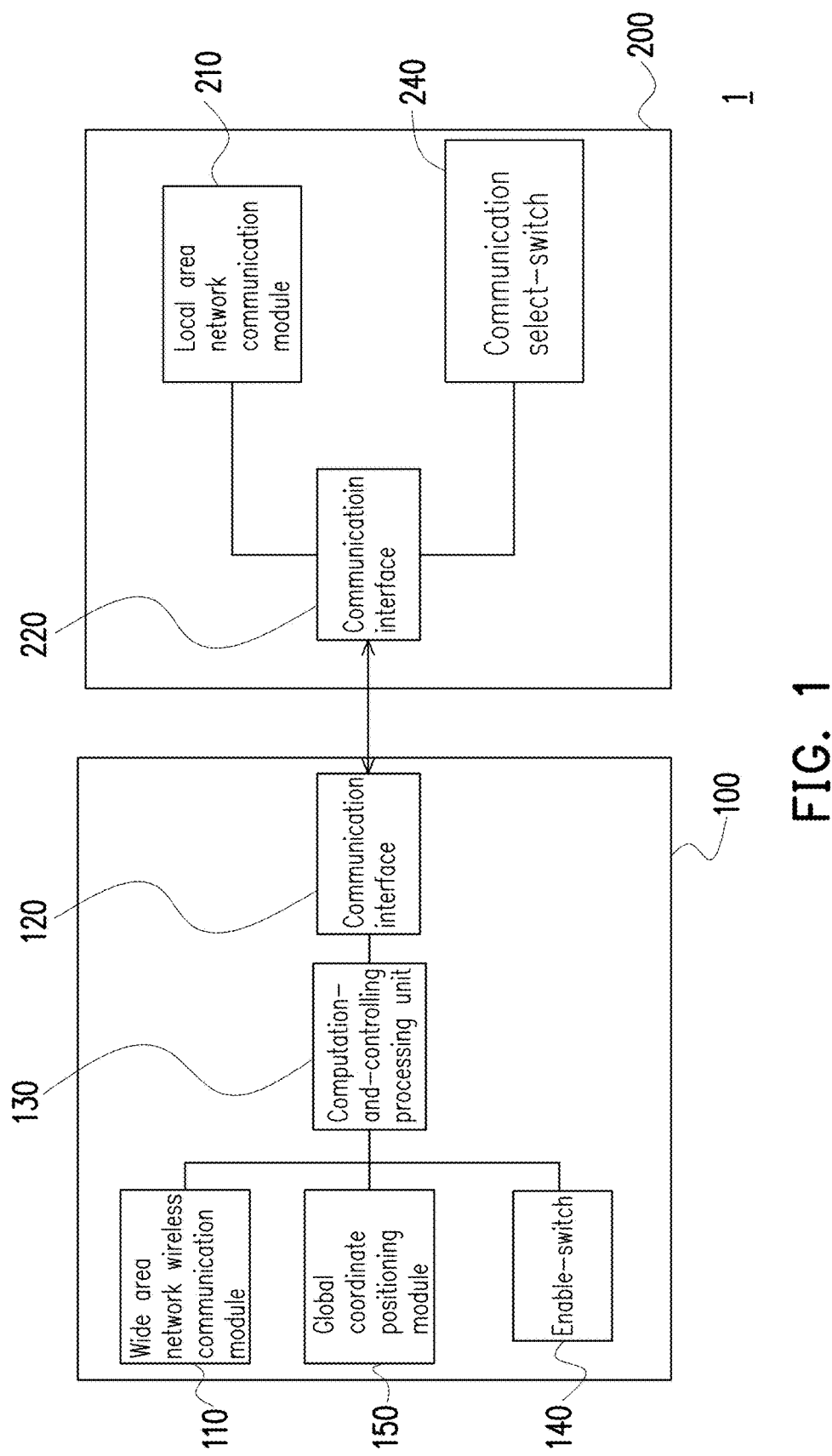
FIG. 1 is a schematic diagram of an integrated function system according to an embodiment of the disclosure.

FIG. 1 is a schematic diagram of an integrated function system 1 according to an embodiment of the disclosure. The integrated function system 1 includes an assemblable wireless Internet connected apparatus 100 and a function-extended apparatus 200.

The assemblable wireless Internet connected apparatus 100 at least includes but is not limited to a WAN wireless communication module 110, a communication interface 120, a computation-and-controlling processing unit 130, an enable-switch 140 and a global coordinate positioning module 150.

The wide area network wireless communication module 110 may be a communication chip, a transceiver or a circuit supporting a Low Power Wide Area Network (LPWAN) such as third generation, fourth generation mobile communication (3G, 4G), Worldwide interoperability for Microwave Access (WiMAX), Narrow Band Internet of Thing (NB-IoT), LTE cat M1, Long Range (LoRa), etc., or other Wireless Wide Area Network (WWAN) communication techniques, and at least includes an antenna, a Digital-to-Analog Converter (DAC), an Analog-to-Digital Converter (ADC), a Subscriber Identity Module (SIM)/Universal Mobile Telecommunications System SIM (UMTS SIM, USIM) card socket circuit, etc., for connecting the Internet or other wide area networks.

The communication interface 120 at least has a chip or a circuit complied with two communication interface standards of a Universal Serial Bus (USB) standard and a Universal Asynchronous Receiver/Transmitter (UART) standard (used for transmitting and receiving data of a corresponding communication protocol), and a connection port (configured with multiple pins), and configuration of the pins is described in detail later in a following embodiment.

The computation-and-controlling processing unit 130 is used to couple to the WAN wireless communication module 110 and the communication interface 120. The computation-and-controlling processing unit 130 may be a Central Processing Unit (CPU), or other programmable general purpose or special purpose microprocessor, a Digital Signal Processor (DSP), a programmable controller, an Application Specific Integrated Circuit (ASIC) or other similar device or a combination of the above devices. In the present embodiment, the computation-and-controlling processing unit 130 is used for executing all of operations of the assemblable wireless Internet connected apparatus 100.

The enable-switch 140 is used to couple to the computation-and-controlling processing unit 130, and the enable-switch 140 may be a toggle switch, a button switch, a capacitive switch, a resistive switch, etc., and has a corresponding circuit to generate a corresponding signal in response to a switch operation.

The global coordinate positioning module 150 is used to couple to the computation-and-controlling processing unit 130, and the global coordinate positioning module 150 supports at least one type of satellite navigation systems such as a Global Positioning System (GPS), a Global Navigation Satellite System (GLONAS) or a BeiDou navigation satellite system, and a chip, a processor or a circuit of the global coordinate positioning module 150 may receive signals sent by the satellite navigation systems through an antenna thereof (probably through signal processing of filtering, analog-to-digital conversion, etc.), so as to obtain positioning information (for example, latitude and longitude, etc.) of the assemblable wireless Internet connected apparatus 100.

On the other hand, the function-extended apparatus 200 at least includes but is not limited to a LAN communication module 210, a communication interface 220 and a communication select-switch 240.

The LAN communication module 210 may be a communication chip, a transceiver or a circuit supporting Bluetooth, ZigBee, Wi-Fi or other types of wireless local area network (WLAN) communication techniques or Z-wave, and at least has an antenna, a DAC, an ADC, etc. for connecting a LAN, and is adapted to communicate with a sensor, a smart switch, a smart home appliance, etc., that has the corresponding communication protocol. It should be noted that the LAN is different to the aforementioned WAN accessed by the WAN wireless communication module 110, and a name thereof may also be a private network or an intra network, etc.

The communication interface 220 is used to couple to the LAN communication module 210, and implementation of the communication interface 220 may refer to the communication interface 120 of the assemblable wireless Internet connected apparatus 100, and detail thereof is not repeated. Since the communication interfaces 120 and 220 have the same or similar specification, when the communication interfaces 120 and 220 are engaged, the assemblable wireless Internet connected apparatus 100 and the function-extended apparatus 200 may transmit data to each other, and detail thereof is described later in a following embodiment.

The communication select-switch 240 is used to couple to the communication interface 220, and implementation of the communication select-switch 240 may refer to the enable-switch 140 of the assemblable wireless Internet connected apparatus 100, and detail thereof is not repeated. It should be noted that in response to a switch operation on the communication select-switch 240, the communication select-switch 240 sends a disable (deactivate) or enable command to the communication interface 220 to disable or enable the communication of the communication interface 220 (with the communication interface 120). However, when the communication of the communication interface 220 is disabled, the function-extended apparatus 200 may still independently operate.

It should be noted that in the aforementioned descriptions of the hardware components of the assemblable wireless Internet connected apparatus 100 and the function-extended apparatus 200, only necessary or important components are mentioned, and other components and functions thereof of each of the apparatuses may be added or adjusted (for example, to add a rechargeable battery, a power management chip, etc.) according to user's requirement, which is not limited by the disclosure.

Figure 2A:
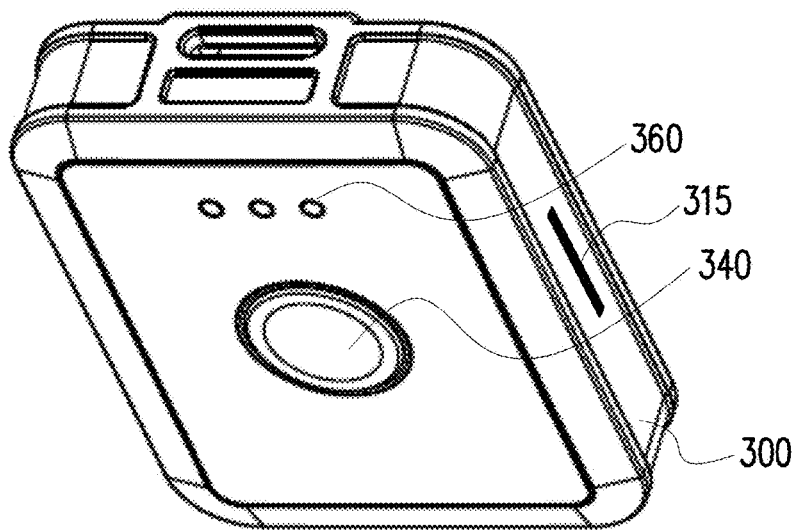
FIG. 2A is a three-dimensional view of an assemblable wireless Internet connected apparatus according to an embodiment of the disclosure.
Figure 2B:
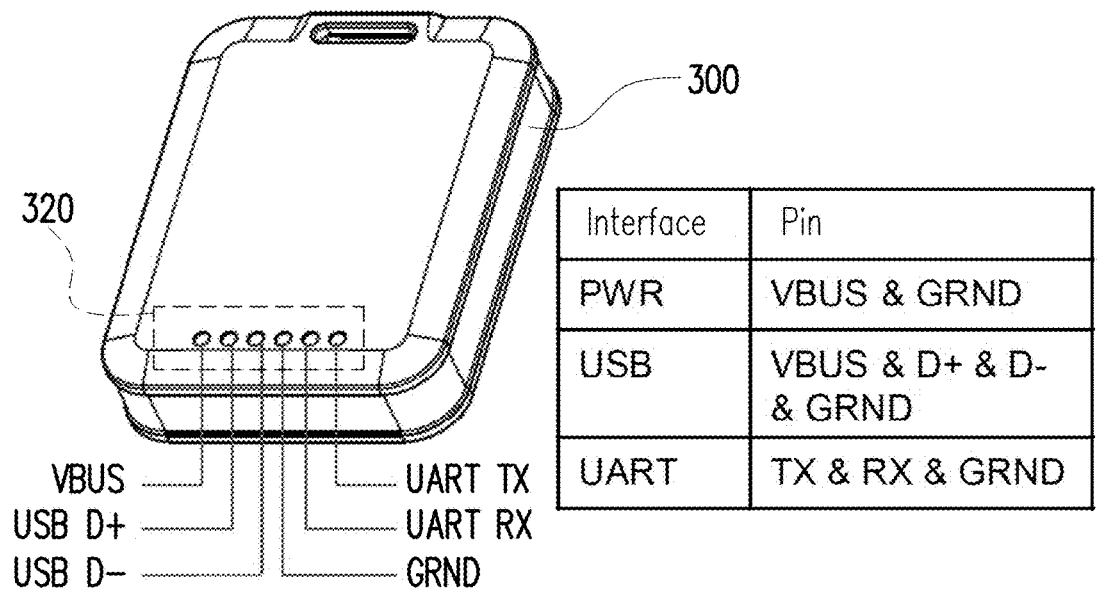
FIG. 2B is a three-dimensional view of an assemblable wireless Internet connected apparatus in another viewing angle according to an embodiment of the disclosure.

In order to fully convey the spirit of the disclosure, an embodiment is provided below for detailed description. FIG. 2A and FIG. 2B are three-dimensional views of an assemblable wireless Internet connected apparatus 300 according to an embodiment of the disclosure. Referring to FIG. 2A and FIG. 2B, the assemblable wireless Internet connected apparatus 300 at least has a SIM card slot 315 (embedded with a SIM card socket circuit), a communication interface 320, a button switch 340 and an indication light 360, where the SIM card slot 315, the communication interface 320 and the button switch 340 may refer to related description of the WAN wireless communication module 110, the communication interface 120 and the enable-switch 140 of FIG. 1, and the assemblable wireless Internet connected apparatus 300 also has the computation-and-controlling processing unit 130 and the global coordinate positioning module 150 (not shown).

It should be noted that as shown in FIG. 2B, the communication interface 320 includes a power interface and interfaces complied with the USB and the UART standards, and forms six junctions exposed out of a casing of the assemblable wireless Internet connected apparatus 300. The power interface includes a VBUS pin and a ground (GRND) pin, and is used for supplying power. The USB interface includes VBUS, D+, D− and GRND pins, and is used for USB communication. The UART interface includes transmitting (TX), receiving (RX) and GRND pins, and is used for UART communication. The GRND pin of the USB interface and the GRND pin of the UART interface are in common.

Moreover, the computation-and-controlling processing unit 130 may control light of the indication light 360 to present an operation status (for example, communication enabling, signal receiving, etc.) of the assemblable wireless Internet connected apparatus 300.

Figure 3A:
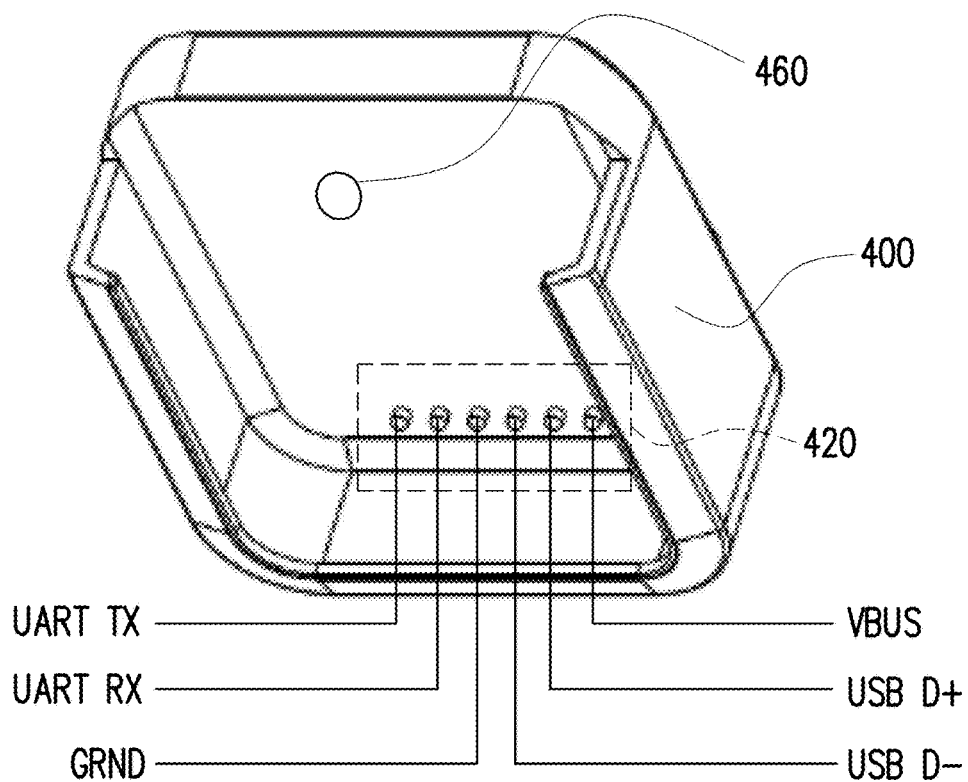
FIG. 3A is a three-dimensional view of a function-extended apparatus according to an embodiment of the disclosure.
Figure 3B:
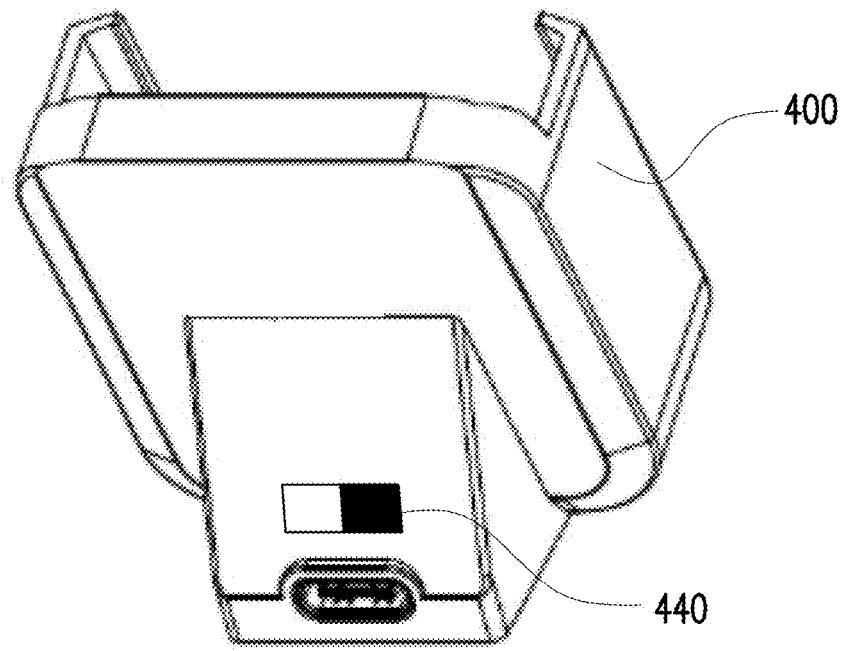
FIG. 3B is a three-dimensional view of a function-extended apparatus in another viewing angle according to an embodiment of the disclosure.

On the other hand, FIG. 3A and FIG. 3B are three-dimensional views of a function-extended apparatus 400 according to an embodiment of the disclosure. Referring to FIG. 3A and FIG. 3B, the function-extended apparatus 400 at least has a communication interface 420, a toggle switch 440 and an indication light 460, where the communication interface 420 and the toggle switch 440 may refer to related description of the communication interface 220 and the communication select-switch 240 of FIG. 1, and the function-extended apparatus 400 also has the LAN communication module 210 (not shown). Referring to FIG. 2B and FIG. 3A, the communication interface 420 and the communication interface 320 have the same pins, and positions of the same pins correspond to each other. Light of the indication light 460 presents an operation status (for example, signal transmitting, malfunction, etc.) of the function-extended apparatus 400.

It should be noted that an appearance design including positions, arrangement, sizes, interval distances, etc. of the pins shown in FIG. 2B and FIG. 3A is only an example, which may be adjusted by the user. Moreover, the common use of the GRND pin of the two communication interface standard may reduce the number of pins, though in other embodiment, the GRND pins are not in common use, so that seven pins are applied.

When the assemblable wireless Internet connected apparatus 300 and the function-extended apparatus 400 are separated, the two apparatuses may independently operate. For example, in response to trigger (for example, a press operation, a touch operation, etc.) of the button switch 340, the computation-and-controlling processing unit 130 of the assemblable wireless Internet connected apparatus 300 enables communication of the WAN wireless communication module 110, such that the positioning information obtained by the global coordinate positioning module 150 may be transmitted to the Internet through the WAN wireless communication module 110. In an implemented scenario, the assemblable wireless Internet connected apparatus 300 may be further connected to an IoT cloud solution server such as an Amazon Web Service (AWS), a Google cloud IoT service or a Microsoft Azure IoT service, etc. through the Internet, such that data sent by the assemblable wireless Internet connected apparatus 300 may be further analyzed and processed. On the other hand, the function-extended apparatus 400 may obtain information (such as sensing values, activation states, etc.) provided by other devices (for example, sensors, a smart switch or other IoT devices) through the LAN communication module 210.

Figure 4A:
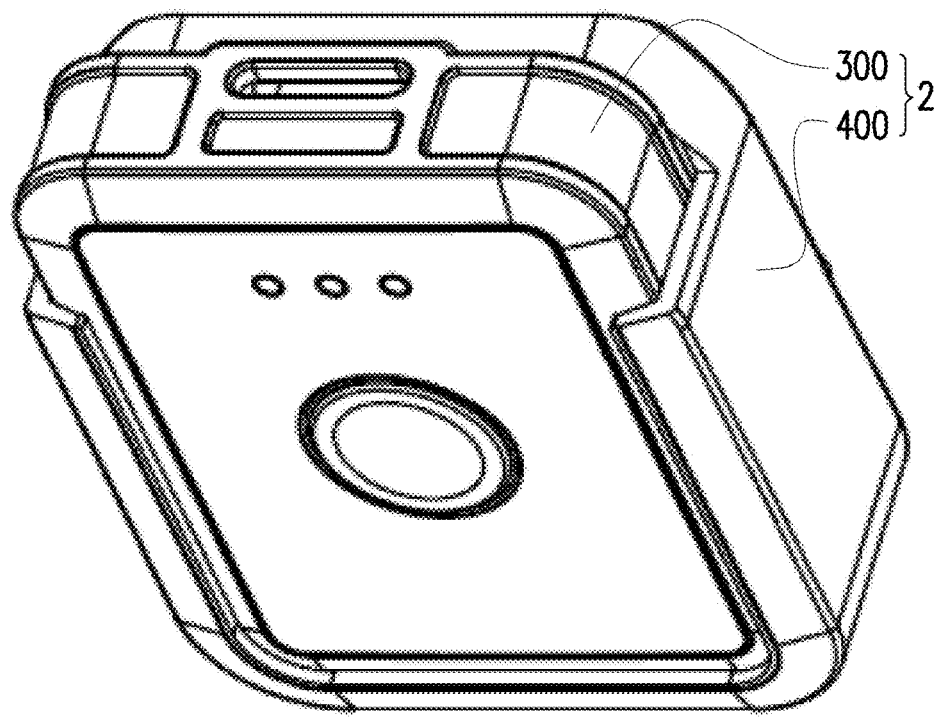
FIG. 4A is a three-dimensional view of the assemblable wireless Internet connected apparatus assembled to the function-extended apparatus according to an embodiment of the disclosure.
Figure 4B:
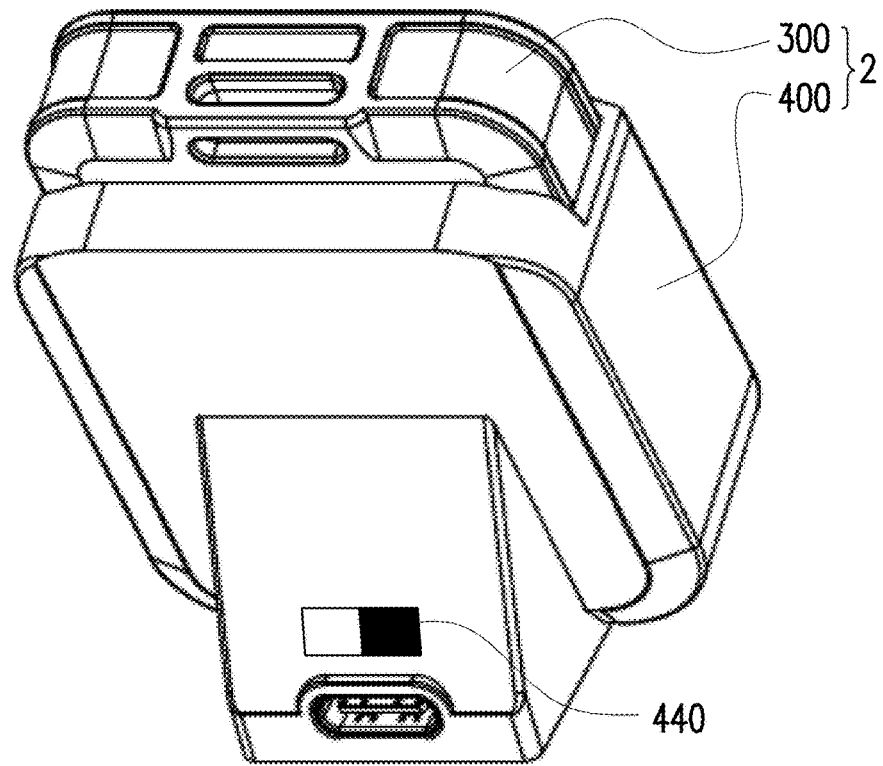
FIG. 4B is a three-dimensional view of the assemblable wireless Internet connected apparatus assembled to the function-extended apparatus in another viewing angle according to an embodiment of the disclosure.

Referring to FIG. 4A and FIG. 4B, the function-extended apparatus 400 serve as a base of the assemblable wireless Internet connected apparatus 300, and the assemblable wireless Internet connected apparatus 300 and the function-extended apparatus 400 are assembled to form an integrated function system 2, where corresponding pins of the communication interface 320 and the communication interface 420 are connected one-to-one (i.e. the USB D+ pin of the communication interface 320 is connected to the USB D+ pin of the communication interface 420, and so on), such that the assemblable wireless Internet connected apparatus 300 and the function-extended apparatus 400 may communicate with each other. For example, the function-extended apparatus 400 obtains data (for example, status information, sensing data, etc.) of another Bluetooth Low Energy (BLE) device through the LAN communication module 210 (for example, a BLE module), and then the function-extended apparatus 400 transmits the obtained data to the communication interface 320 through the communication interface 420 (for example, through the UART interface), and the computation-and-controlling processing unit 130 of the assemblable wireless Internet connected apparatus 300 may transmit the data coming from the function-extended apparatus 400 to Internet through the WAN wireless communication module 110. Namely, the combination of the assemblable wireless Internet connected apparatus 300 and the function-extended apparatus 400 provides the other IoT network devices within the LAN to access or bridge to Internet, so as to achieve heterogeneous network integration. Moreover, the assemblable wireless Internet connected apparatus 300 and the function-extended apparatus 400 may charge each other (at least one of the two apparatuses have a battery or is adapted to connect an external power) through the power interfaces in the communication interfaces 310, 410.

Figure 5:
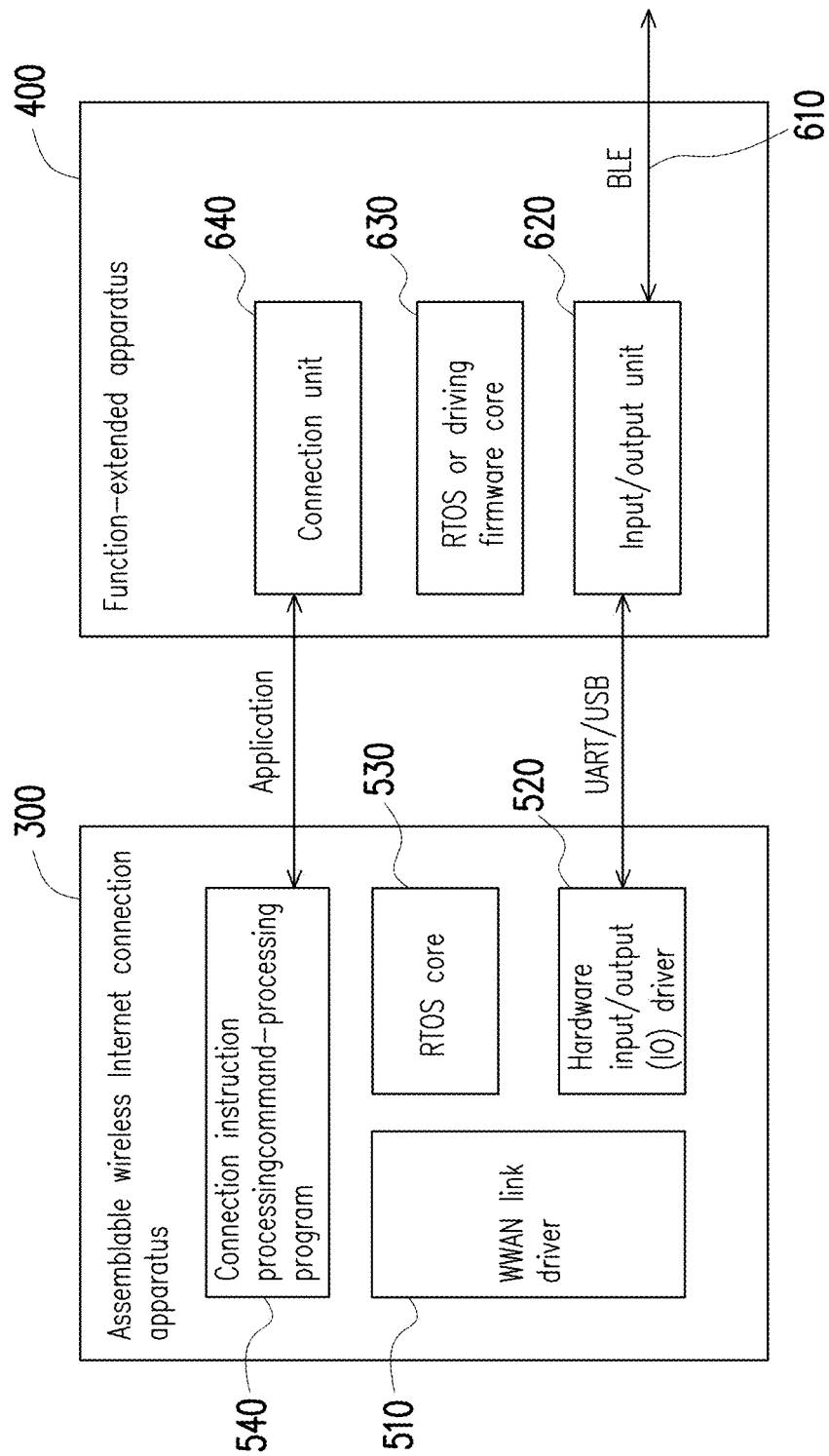
FIG. 5 is a software structure diagram according to an embodiment of the disclosure.

In terms of a software level, FIG. 5 is a software structure diagram of the assemblable wireless Internet connected apparatus 300 and the function-extended apparatus 400. The WAN wireless communication module 110 of the assemblable wireless Internet connected apparatus 300 runs a WWAN link driver 510, the communication interface 320 processes a hardware Input/Output (JO) driver 520, and the computation-and-controlling processing unit 130 runs a Real-Time Operation System (RTOS) core 530 and a connection command-processing program 540. The BLE module of the function-extended apparatus 400 executes a BLE communication function 610, the communication interface 420 processes an JO unit 620, and the function-extended apparatus 400 runs a RTOS or driving firmware core 630 and a connection unit 640. In terms of a combination of the operations, communication of the applications is implemented through the connection command-processing program 540 and the connection unit 640, and communication of UART and USB is executed through the hardware IO driver 520 and the IO unit 620.

Based on the function configuration of the aforementioned integrated function systems 1 and 2, a novel development pattern is brought to related companies: for example, an company provides a development template of the assemblable wireless Internet connected apparatus 300 and discloses appearance designs and program source codes of the communication interfaces 120, 220, 320, 420, such that a third-party community development group may directly develop the function-extended apparatuses 200 and 400 to finally form commodity devices of three types (WWAN, WLAN, WWAN combined with WLAN (i.e. the heterogeneous network integration) of function patterns.

Figure 6:
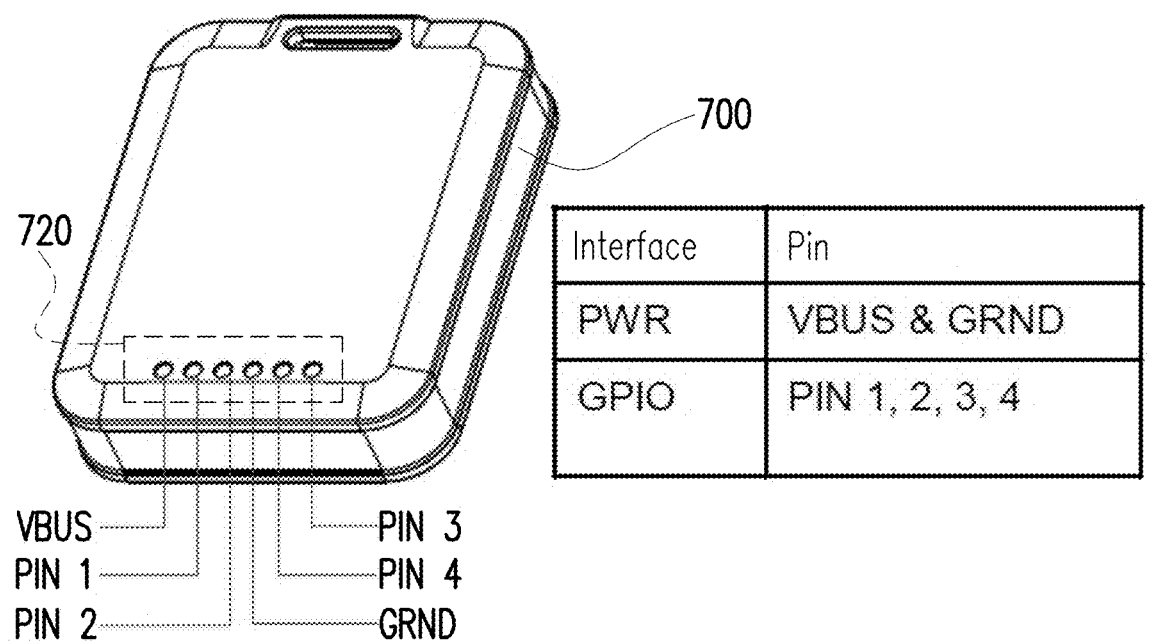
FIG. 6 is a three-dimensional view of an assemblable wireless Internet connected apparatus according to another embodiment of the disclosure.

Moreover, based on the disclosure spirit of the aforementioned embodiments, the disclosure may have a variation. For example, FIG. 6 illustrates an assemblable wireless Internet connected apparatus 700 according to another embodiment of the disclosure. By replacing TX/RX and USB D+/D− signals of the UART interface in the communication interface 320 and 420 in FIG. 2B and FIG. 3A by GPIO input signals (represented by pins 1-4), the connection command-processing program 540 shown in FIG. 5 used for processing the UART communication signal is adjusted to be able to process the GPIO signals. Moreover, the communication interface 420 of the function-extended device 400 may have at least one of the power interface, the USB interface and the UART interface, though the position thereof should be corresponding to the communication interface 320.

In summary, the embodiments of the disclosure provide the assemblable wireless Internet connected apparatus and the function-extended apparatus, after the two apparatuses are separated, the two apparatus may independently operate, and a combination of the two apparatuses may send the information communicated within the WLAN to Internet, so as to integrate the heterogeneous network. The community development group may rapidly expand the application field of the devices applying the WLAN communication technique, so as to expand development of an ecological chain of heterogeneous network application commodity. Moreover, the function-extended apparatus may also provide new application expansion capability.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An assemblable wireless Internet connected apparatus, adapted to connect a function-extended apparatus, and comprising:
   a wide area network wireless communication module, configured to connect the Internet;
   a communication interface, configured to connect the function-extended apparatus, and complied with two communication interface technologies, wherein the two communication interface technologies comprises Universal Serial Bus (USB) and Universal Asynchronous Receiver/Transmitter (UART); and
   a computation-and-controlling processing unit, coupled to the wide area network wireless communication module and the communication interface, and configured to communicate through the communication interface, receive a data from the communication interface and directly transmit the data obtained from the communication interface to the Internet through the wide area network wireless communication module.

2. The assemblable wireless Internet connected apparatus as claimed in claim 1, wherein the communication interface comprises a VBUS pin, a D+ pin, a D− pin and a ground pin complied with the USB.

3. The assemblable wireless Internet connected apparatus as claimed in claim 1, wherein the communication interface comprises a transmitting (TX) pin, a receiving (RX) pin and a ground pin complied with the UART.

4. The assemblable wireless Internet connected apparatus as claimed in claim 2, wherein the ground pin of the USB and the ground pin of the UART are in common.

5. The assemblable wireless Internet connected apparatus as claimed in claim 3, wherein the ground pin of the USB and the ground pin of the UART are in common.

6. The assemblable wireless Internet connected apparatus as claimed in claim 1, further comprising:
an enable-switch, coupled to the computation-and-controlling processing unit, wherein in response to the enable-switch being triggered, the computation-and-controlling processing unit enables communication of the wide area network wireless communication module.

7. The assemblable wireless Internet connected apparatus as claimed in claim 1, further comprising:
a global coordinate positioning module, coupled to the computation-and-controlling processing unit, and configured to obtain positioning information,
wherein the computation-and-controlling processing unit sends the positioning information through the wide area network wireless communication module.

8. An integrated function system, comprising:
a function-extended apparatus, comprising a first communication interface, wherein the first communication interface is complied with two communication interface technologies, and the two communication interface technologies comprise Universal Serial Bus (USB) and Universal Asynchronous Receiver/Transmitter (UART); and
an assemblable wireless Internet connected apparatus, comprising:
a wide area network wireless communication module, configured to connect the Internet;
a second communication interface, configured to engage with the first communication interface of the function-extended apparatus, wherein the second communication interface is complied with the two communication interface technologies; and
a computation-and-controlling processing unit, coupled to the wide area network wireless communication module and the second communication interface, and configured to communicate with the function-extended apparatus through the second communication interface, receive a data from the second communication interface and directly transmit the data coming from the function-extended apparatus to the Internet through the wide area network wireless communication module.

9. The integrated function system as claimed in claim 8, wherein the first and second communication interfaces comprise a VBUS pin, a D+ pin, a D− pin and a ground pin complied with the USB.

10. The integrated function system as claimed in claim 8, wherein the first and second communication interfaces comprise a TX pin, a RX pin and a ground pin complied with the UART.

11. The integrated function system as claimed in claim 9, wherein the ground pin of the USB and the ground pin of the UART are in common.

12. The integrated function system as claimed in claim 10, wherein the ground pin of the USB and the ground pin of the UART are in common.

13. The integrated function system as claimed in claim 8, wherein the assemblable wireless Internet connected apparatus further comprises:
an enable-switch, coupled to the computation-and-controlling processing unit, wherein in response to the enable-switch being triggered, the computation-and-controlling processing unit enables communication of the wide area network wireless communication module.

14. The integrated function system as claimed in claim 8, wherein the assemblable wireless Internet connected apparatus further comprises:
a global coordinate positioning module, coupled to the computation-and-controlling unit, and configured to obtain positioning information,
wherein the computation-and-controlling unit sends the positioning information through the wide area network wireless communication module.

15. The integrated function system as claimed in claim 8, wherein the function-extended apparatus further comprises:
a local area network communication module, coupled to the first communication interface, and configured to connect a local area network,
wherein the computation-and-controlling unit of the assemblable wireless Internet connected apparatus receives, through the second communication interface, data coming from the local area network via the first communication interface.

16. The integrated function system as claimed in claim 8, wherein the function-extended apparatus further comprises:
a communication select-switch, coupled to the first communication interface, and configured to enable communication of the first communication interface.

* * * * *